(12) United States Patent
Li et al.

(10) Patent No.: US 11,946,345 B2
(45) Date of Patent: Apr. 2, 2024

(54) NATURAL GAS HYDRATE EXPLOITATION EXPERIMENTAL DEVICE AND METHOD FOR FULL-SIZED PRODUCTION WELLS

(71) Applicant: GUANGZHOU INSTITUTE OF ENERGY CONVERSION, CHINESE ACADEMY OF SCIENCES, Guangzhou (CN)

(72) Inventors: Xiaosen Li, Guangzhou (CN); Zhaoyang Chen, Guangzhou (CN); Yi Wang, Guangzhou (CN); Zhiming Xia, Guangzhou (CN); Gang Li, Guangzhou (CN); Yu Zhang, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 626 days.

(21) Appl. No.: 17/257,312

(22) PCT Filed: Sep. 8, 2020

(86) PCT No.: PCT/CN2020/114104
§ 371 (c)(1),
(2) Date: Dec. 31, 2020

(87) PCT Pub. No.: WO2021/159700
PCT Pub. Date: Aug. 19, 2021

(65) Prior Publication Data
US 2022/0298891 A1 Sep. 22, 2022

(30) Foreign Application Priority Data
Aug. 6, 2020 (CN) .......... 202010784668.5

(51) Int. Cl.
*G09B 23/40* (2006.01)
*E21B 41/00* (2006.01)

(52) U.S. Cl.
CPC .......... *E21B 41/0099* (2020.05); *G09B 23/40* (2013.01)

(58) Field of Classification Search
CPC ...... E21B 2200/20; E21B 36/00; E21B 43/00; E21B 43/35; E21B 43/01; E21B 43/086; E21B 41/0099; G09B 23/40
See application file for complete search history.

(56) References Cited

U.S. PATENT DOCUMENTS

2016/0305205 A1* 10/2016 Li ........................... E21B 34/00
2022/0154091 A1* 5/2022 Ng ........................... G01N 15/04
(Continued)

*Primary Examiner* — Alexander A Mercado
(74) *Attorney, Agent, or Firm* — Bayramoglu Law Offices LLC

(57) ABSTRACT

A device and a method for experimental exploitation of natural gas hydrates in full-sized production wells are provided. The device includes a full-diameter well, and the full-diameter well includes a heating circulation tube, a temperature sensor tube, an upper sealing unit and a lower sealing unit. Perforations are provided along a body of the full-diameter well. A reactor includes an upper cover, a lower cover, and a reactor body. The method is conducted by using the device and the reactor. The device and method allow simulation of sand-control wellbores in actual exploitation of natural gas hydrates, and realize horizontal and vertical sand-control experiments.

18 Claims, 5 Drawing Sheets

(56) References Cited

U.S. PATENT DOCUMENTS

| 2022/0235646 A1* | 7/2022 | Li | E21B 47/002 |
| 2022/0236203 A1* | 7/2022 | Liu | G01N 33/383 |
| 2022/0299495 A1* | 9/2022 | Li | G01N 33/24 |
| 2022/0301457 A1* | 9/2022 | Li | G09B 23/40 |

* cited by examiner

NATURAL GAS HYDRATE EXPLOITATION EXPERIMENTAL DEVICE AND METHOD FOR FULL-SIZED PRODUCTION WELLS

CROSS REFERENCE TO THE RELATED APPLICATIONS

This application is the national phase entry of International Application No. PCT/CN2020/114104, filed on Sep. 8, 2020, which is based upon and claims priority to Chinese Patent Application No. 202010784668.5, filed on Aug. 6, 2020, the entire contents of which are incorporated herein by reference.

TECHNICAL FIELD

The present invention relates to the technical field of simulated exploitation of natural gas hydrates, and particularly relates to a device and a method for experimental exploitation of natural gas hydrates in full-sized production wells.

BACKGROUND

Natural gas hydrates (NGH; also known as flammable ice) are white ice-like crystals formed by the combination of water molecules and gas molecules such as light hydrocarbons, $CO_2$ and $H_2S$ under low temperature and high pressure. They are non-stoichiometric clathrate. Natural gas hydrates can be found all over the world with huge reserves, and have been considered to be a superior and clean energy source in the future, as they hold twice the total carbon in the conventional fossil fuel reserves (petroleum, natural gas, and coal), making them the most important energy resource in the $21^{st}$ century.

Well simulation schemes in current studies of natural gas hydrates are featured by small sizes, much different with the sizes of actual wells, making it difficult to transfer the experimental results into practical applications. Also, the current well simulation schemes do not comprise sand-control simulated wells, or comprise only one single sand-control simulated well, such that one simulation only allows assessing the performance of one sand-control screen, and thereby it takes a longer time for an experiment. Current simulated wells do not comprise sensors for heated pipe flow and wellbore temperature, but can only carry out a single measurement of sand production. Current simulated wells are not designed to allow tiered drainage. Most simulated well systems only comprise a single tiny simulated well, and thus it is impossible to carry out simulation of full-sized sand-control exploitation both horizontally and vertically. For current simulated well systems, it is impossible to carry our sand control experiment for different screens.

SUMMARY

In view of the above deficiencies of prior art, the present invention provides a device and a method for simulating exploitation of natural gas hydrates in full-sized production wells, which allow simulation of sand-control wellbores in actual exploitation of natural gas hydrates, and realize horizontal and vertical sand-control experiments.

In order to achieve the above object, the present invention comprises:

A first aspect is a device for simulating exploitation of natural gas hydrates in full-sized production wells, configured to disposed in a reactor, the reactor comprising an upper cover, a lower cover, and a reactor body, the upper cover and the lower cover being sealably attached to two ends of the reactor to form a closed chamber, the chamber being filled with porous medium and liquid, and the porous medium and the liquid being configured to simulate a geologically layered structure of a hydrate reservoir, wherein, the device comprises a full-diameter well, the full-diameter well comprises an upper sealing unit and a lower sealing unit, and a heating circulation tube and a temperature sensor tube are disposed inside the full-diameter well;

the upper sealing unit comprises an upper plug and an upper plug locking cap; the upper plug is sealingly inserted into an upper end of the full-diameter well and fixed by the upper plug locking cap; a gas discharging passage is provided penetrating the upper plug, wherein the gas discharging passage is configured to discharge methane gas during the simulated exploitation of natural gas hydrates;

the lower sealing unit comprises a lower plug and a lower plug locking cap; the lower plug is sealingly inserted into a lower end of the full-diameter well and fixed by the lower plug locking cap; an exploitation passage and a water discharging passage are provided penetrating the lower plug, wherein the exploitation passage is configured to discharge a gas-water-sand mixture during the simulated exploitation of natural gas hydrates, and the water discharging passage is configured to discharge water from the full-diameter well during the simulated exploitation of natural gas hydrates to obtain a well fluid;

a first end of the heating circulation tube penetrates the upper plug and is fixed at the upper plug; a second end of the heating circulation tube extends towards the lower end of the full-diameter well until it bends above the lower end of the full-diameter well and thereby extends towards the upper end of the full-diameter well; the heating circulation tube is configured to prevent hydrate formation inside the full-diameter well;

a first end of the temperature sensor tube penetrates the upper plug and is fixed at the upper plug; a second end of the temperature sensor tube extends towards the lower end of the full-diameter well; temperature sensors are provided inside the temperature sensor tube, wherein the temperature sensors are configured to obtain temperature data from inside of the full-diameter well during the simulated exploitation of natural gas hydrates;

perforations are provided along a body of the full-diameter well, wherein each of the perforations is optionally provided with a sand control unit; the perforations are configured to simulate a well completion process by being closed during a hydrate formation process and being open during the simulated exploitation; and more importantly, the perforations is capable of preventing the hydrate formation inside the full-diameter well such that the simulation reflects actual formation and exploitation of hydrates.

Furthermore, the sand control unit comprises a perforation fixing ring, a screen gasket, and a sand control screen, the screen gasket is disposed between the sand control screen and the perforation, and the sand control screen is fixed to the perforation by the perforation fixing ring.

Furthermore, the water discharging passage comprises four water discharging pipes, wherein first ends of the four water discharging pipes penetrate the lower plug and are fixed at the lower plug, second ends of the four water discharging pipes extend towards the upper plug to four different extents to form a stair-like structure such that the four water discharging pipes are respectively configured to discharge ¼, ²⁄₄, ¾, and all of the water from the full-diameter well in order to simulate water discharging at different levels.

Furthermore, the upper plug has a flange, and an inner step is formed at the upper end of the full-diameter well for mating the flange, wherein when the upper plug is sealingly inserted into the upper end of the full-diameter well, the flange of the upper plug is stuck at the inner step, and the upper plug locking cap covers the flange to realize sealing; a first O-ring is sealingly provided between the first end of the temperature sensor tube and the upper plug; a section of the heating circulation tube that sticks out from the upper plug is fixed by a locknut.

Furthermore, a filter element is provided at a gas inlet of the gas discharging passage, a filter element gasket is provided between the filter element and the upper plug, and the filter element is fixed at the gas inlet by a filter element fixing cap; the first end of the heating circulation tube is fixed at the upper plug by a double ferrule fitting and a hollow bolt; a second O-ring is sealingly provided between the lower plug and the full-diameter well; the full-diameter well and the upper plug locking cap are made of poly (ether ether ketone) (PEEK) or nylon, and are surface roughened.

Furthermore, a temperature gradient simulator is provided inside the reactor, and the temperature gradient simulator comprises an upper circulation coil and a lower circulation coil; the upper circulation coil and the lower circulation coil are respectively disposed at an upper end and a lower end inside the reactor body; the upper circulation coil and the lower circulation coil are respectively provided with an independent heat exchange device to realize circulation of a heat transfer medium in the coil; temperature control pipes are spacedly provided, with an amount of N, inside the reactor body and between the upper circulation coil and the lower circulation coil, and configured to form a vertical temperature gradient in the reactor body, wherein N is a positive integer; each temperature control pipe is also provided with an independent heat exchange device to realize the circulation of the heat transfer medium in the temperature control pipe.

Furthermore, the N temperature control pipes are equally spaced from bottom to top and a constant temperature difference is given between the temperature control pipes, wherein the temperature difference is expressed as:

$\Delta T=(T_1-T_2)/(N+1)$, wherein $T_1$ represents a temperature of the lower circulation coil, and $T_2$ represents a temperature of the upper circulation coil, and $T_1>T_2$.

Furthermore, temperature sensors are provided inside the reactor body and configured to monitor the temperatures of the upper circulation coil, the lower circulation coil and the N temperature control pipes and transmit the monitored temperature data to a regulator; the regulator is configured to regulate in real time the operation of each heat exchange device according to the monitored temperature data, so as to maintain the vertical temperature gradient in the reactor body stable.

Furthermore, a mesh is provided at the exploitation passage, the mesh is fixed at an inlet groove of the exploitation passage by a mesh fixing cap, and a mesh gasket is provided between the mesh and the inlet groove.

A second aspect is a method for simulating exploitation of natural gas hydrates in full-sized production wells, using any one of the above mentioned device and the reactor. The method comprises:

sealing a certain amount of the perforations or providing each of the certain amount of the perforations with the sand control unit;

sealingly disposing the full-diameter well inside the reactor throughout a horizontal direction of a vertical direction and initiating the hydrate formation process, wherein the upper end of the full-diameter well protrudes from the upper cover of the reactor, the perforations are positioned inside the reactor body, and the lower end of the full-diameter well protrudes from the lower cover of the reactor;

after natural gas hydrates formed in the reactor are sufficient for carrying out the simulated exploitation, allowing the gas-water-sand mixture to enter the full-diameter well through the perforations, discharging the gas-water-sand mixture through the exploitation passage, discharging the water through the water discharging passage, and discharging the methane gas through the gas discharging passage.

Compared with the prior art, the present invention has the following beneficial effects. The device allows simulation of sand control techniques in NGH exploitation, and helps optimizing well design and sand control techniques. The perforations can be respectively provided with sand control screens of different mesh sizes, allowing the evaluation of sand control effects of different mesh sizes. The well and the locking cap are made of poly (ether ether ketone) (PEEK) or nylon and are surface roughened, which prevents the interfacial flow along the wall and reduces heat loss. The sealing is realized by O-rings, which allows loading sands after disposing in the reactor. The stair-like structure of the water discharging passage allows discharging different levels of water. The device can be disposing either horizontally or vertically to simulate a horizontal exploitation and a vertical exploitation. Heat controlling and monitoring inside the well are realized by the heating circulation tube and the temperature sensors; the heating circulation tube also prevent hydrate formation inside the well during the hydrate formation process inside the reactor. A methane production outlet is provided at the upper end and a water production outlet is provided at the lower end, and the two outlets are respectively provided with a corrosion-resistant and sand-control filter element made of sintered metal, such that sand production will not affect the equipments connected to the two outlets. The central vertical well can be replaced by a smaller well in a sand control slotted liner, which uses a bushing at the reactor cover for sealing. Multiple perforations are evenly provided along the well for studying sand control; simulation of sand control design or blockage at different regions can be realized by installing sand-control units or sealing the corresponding perforations. Technical solutions and designs of the full-sized wells and gas-solid-liquid separation devices can be directly transferred to actual exploitation of natural gas hydrates upon modification thereto.

Reference signs: 1, third O-ring; 2, locknut; 3, filter element fixing cap; 4, filter element gasket; 5, filter element; 6, upper plug; 7, double ferrule fitting; 8, first O-ring; 9, upper plug locking cap; 10, hollow bolt; 11, full-diameter well; 12, temperature sensor tube; 13; upper cover fixing groove; 14, inner surface of upper cover; 15, inner surface of lower cover; 16; perforation fixing ring; 17, screen gasket; 18; sand control screen; 19, heating circulation tube; 20, outer surface of lower cover; 21, mesh fixing cap; 22, lower plug; 23, lower plug locking cap; 24, second O-ring; 25, mesh; 26 mesh gasket; 27, slotted pan head screw; 28, water discharging pipe; 29, first water discharging pipe; 30, second water discharging pipe; 31, third water discharging pipe; 32, fourth water discharging pipe; 33, fifth water discharging pipe;

200, reactor body; 201, upper cover; 202, lower cover; 203; upper circulation coil; 204, lower circulation coil; 205, temperature control pipe; 206, bolt;

301, central vertical well outlet pipeline; 302, central vertical well pressure sensor; 303, central vertical well outlet valve; 304, communicating vessel; 305, non-central vertical well outlet pipeline; 306, non-central vertical well pressure sensor; 307, non-central vertical well outlet valve; 308, differential pressure sensor; 309, communicating vessel valve; 310, communicating vessel pressure sensor; 311, gas injection valve.

DETAILED DESCRIPTION OF THE EMBODIMENTS

The content of the present invention will be further described in detail below with reference to the drawings and specific embodiments.

EXAMPLE

Figure 1:
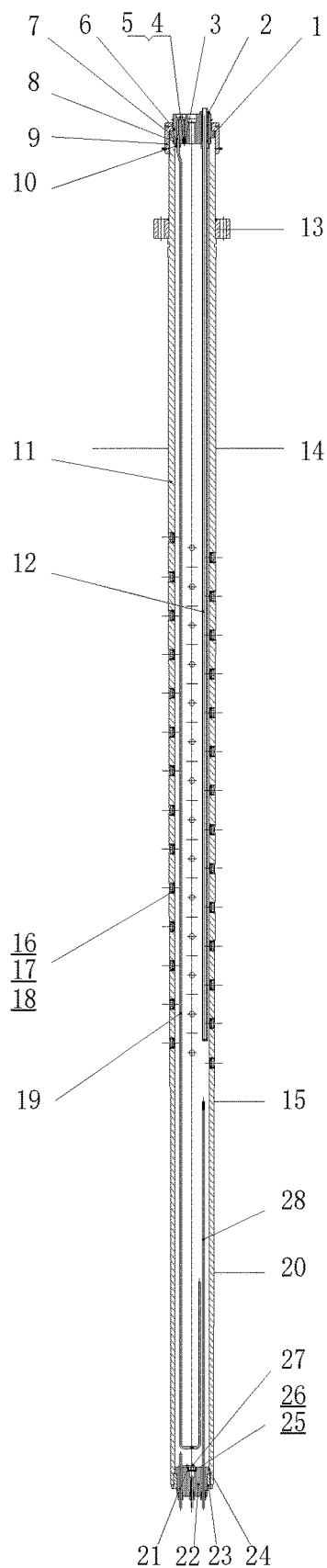
FIG. 1 shows the device of the present invention.
Figure 2:
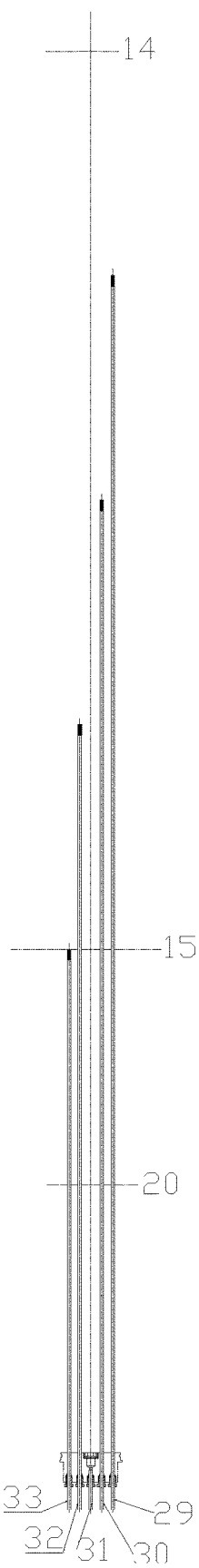
FIG. 2 shows the stair-like structure of the water discharging passage.

As shown in FIG. 1 and FIG. 2, the full-diameter well 11 in this example is used for central exploitation, but would be also applicable for non-central exploitation. The device for simulating exploitation of natural gas hydrates comprises a full-diameter well 11. A heating circulation tube 19 and a temperature sensor tube 12 are provided inside the full-diameter well 11. The full-diameter well 11 also comprises an upper sealing unit and a lower sealing unit. The upper sealing unit comprises an upper plug 6 and an upper plug locking cap 9. The upper plug 6 is sealingly inserted into an upper end of the full-diameter well 11 and fixed by the upper plug locking cap 9. A gas discharging passage is provided penetrating the upper plug 6, wherein the gas discharging passage is configured to discharge methane gas during the simulated exploitation of natural gas hydrates. A filter element 5 is provided at a gas inlet of the gas discharging passage, a filter element gasket 4 is provided between the filter element 5 and the upper plug 6, and the filter element 5 is fixed at the gas inlet by a filter element fixing cap 3. The lower sealing unit comprises a lower plug 22 and a lower plug locking cap 23. The lower plug 22 is sealingly inserted into a lower end of the full-diameter well 11 and fixed by the lower plug locking cap 23. An exploitation passage and a water discharging passage are provided penetrating the lower plug 22, wherein the exploitation passage is configured to discharge a gas-water-sand mixture during the simulated exploitation of natural gas hydrates, and the water discharging passage is configured to discharge water from the full-diameter well 11 during the simulated exploitation of natural gas hydrates. A mesh 25 is provided at the exploitation passage, the mesh 25 is fixed at an inlet groove of the exploitation passage by a mesh fixing cap 21, and a mesh gasket 26 is provided between the mesh 25 and the inlet groove. A first end of the heating circulation tube 19 penetrates the upper plug 6 and is fixed at the upper plug 6; a second end of the heating circulation tube 19 extends towards the lower end of the full-diameter well 11 until it bends above the lower end of the full-diameter well 11 and thereby extends towards the upper end of the full-diameter well 11. The first end of the heating circulation tube 19 is fixed at the upper plug 6 by a double ferrule fitting 7 and a hollow bolt 10. The heating circulation tube 19 is configured to prevent hydrate formation inside the full-diameter well 11. A first end of the temperature sensor tube 12 penetrates the upper plug 6 and is fixed at the upper plug 6. A second end of the temperature sensor tube 12 extends towards the lower end of the full-diameter well 11. Temperature sensors are provided inside the temperature sensor tube 12, wherein the temperature sensors are configured to obtain temperature data from inside of the full-diameter well 11 during the simulated exploitation of natural gas hydrates. Perforations are provided along a body of the full-diameter well 11, wherein each of the perforations is optionally provided with a sand control unit. The sand control unit comprises a perforation fixing ring 16, a screen gasket 17, and a sand control screen 18, the screen gasket 17 is disposed between the sand control screen 18 and the perforation, and the sand control screen 18 is fixed to the perforation by the perforation fixing ring 16. A second O-ring 24 is sealingly provided between the lower plug 22 and the full-diameter well 11; the full-diameter well 11 and the upper plug locking cap 9 are made of poly (ether ether ketone) or nylon, and are surface roughened.

When the device is inserted into the reactor, it is threadedly fixed to the upper cover of the reactor at an upper cover fixing groove. The well section between the inner surface 14 of upper cover and the inner surface 15 of lower cover is located inside the reactor. The well body is made of a high-strength non-metallic material. The upper cover fixing groove 13 and the outer surface 20 of lower cover are outside the reactor. The mesh fixing cap 21, the mesh 25, and the mesh gasket 26 are fixed at the well bottom by a slotted pan head screw 27. The lower plug 22 is sealingly fixed by the lower plug locking cap 23 with a second O-ring 24.

Furthermore, the upper plug 6 has a flange, and an inner step is formed at the upper end of the full-diameter well 11 for mating the flange, wherein when the upper plug 6 is sealingly inserted into the upper end of the full-diameter well 11, the flange of the upper plug 6 is stuck at the inner step, and the upper plug locking cap 9 covers the flange to realize sealing. A first O-ring 8 is sealingly provided between the first end of the temperature sensor tube 12 and the upper plug 6. The heating circulation tube 19 comprises a section that sticks out from the upper plug 6, and this section is fixed by a locknut. A third O-ring 1 is provided between the heating circulation tube 19 and the upper plug 6.

Furthermore, the water discharging passage comprises four water discharging pipes 28, wherein first ends of the four water discharging pipes 28 penetrate the lower plug 22 and are fixed at the lower plug 22, second ends of the four water discharging pipes 28 extend towards the upper plug 6 to four different extents to form a stair-like structure such that the four water discharging pipes are respectively configured to discharge $\frac{1}{4}$, $\frac{2}{4}$, $\frac{3}{4}$, and all of the water from the full-diameter well 11 in order to simulate water discharging at different levels. The first water discharging pipe 29 is configured to discharge ¼ of the water from the well; the second water discharging pipe 30 is configured to discharge ²⁄₄ of the water from the well; the third water discharging pipe 31 is configured to discharge all of the water from the reactor; the fourth water discharging pipe 32 is configured to discharge ¾ of the water from the well; the fifth water discharging pipe 33 is configured to discharge all of the water from the well.

The device is configured to carry out study on the exploitation in full-sized production wells, and helps optimizing well design and sand control techniques. The device is operated by the following steps:

A first step comprises sealing a certain amount of the perforations or providing each of the certain amount of the perforations with the sand control unit, wherein simulation of sand control design or blockage at different regions can be realized by installing sand-control units or sealing the corresponding perforations. The perforations can be respectively provided with sand control screens of different mesh sizes, allowing the evaluation of sand control effects of different mesh sizes. A second step comprises inserting the well into the reactor along the axial direction wherein the well is in contact with the inner surface 14 of upper cover and the inner surface 15 of lower cover at the two horizontal lines as shown in FIG. 1, with sealing means between the reactor and the well. The water discharging pipes of different levels allow discharging different amounts of water from the well during the simulated exploitation. The heating circulation tube 19 and the temperature sensors provided in the well enable the control and monitoring of heating inside the well. The heating circulation tube also prevents hydrate formation inside the well.

Figure 3:
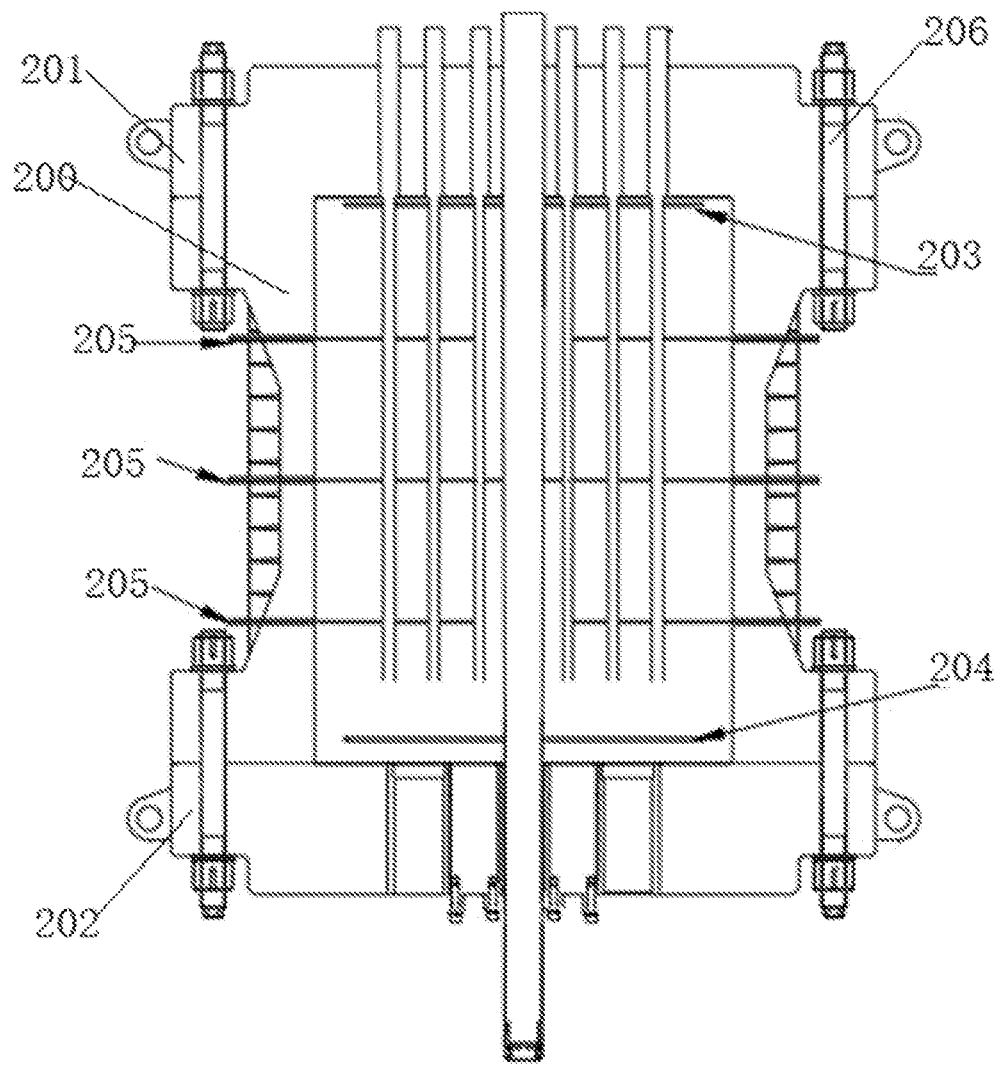
FIG. 3 shows the temperature gradient simulator provided in the reactor.

In addition, since currently existing natural gas hydrate experimental devices are constructed, as compared with actual formation environment, in a scale not enough to present a temperature gradient, most reactors are configured to be disposed in a constant temperature water bath. However, in actual exploitation, natural gas hydrate reservoirs are affected by the temperature of the formation, and there will be certain temperature differences and temperature gradient as the temperature changes with depth. The temperature gradient will have a certain impact on the formation and exploitation of natural gas hydrates, resulting in a higher requirement, for simulating the formation temperature gradient, on large-scale natural gas hydrate devices which operate in a situation closer to the actual exploitation; thus, how to accurately control the formation temperature gradient, in order to realize the in-situ temperature field simulation of the NGH reservoir, is a technical problem to be solved at present Accordingly, as shown in FIG. 3, the reactor 20 comprises a reactor body 200, an upper cover 201 disposed at an upper surface of the reactor body 200, and a lower cover 202 disposed at a lower surface of the reactor body 200. The connection between the reactor body 200 and the upper and lower covers are realized by means of bolts 206, such that the connection is stable, firm, safe and reliable.

An upper circulation coil 203 and a lower circulation coil 204 are respectively disposed at an upper end and a lower end inside the reactor body 200. The upper circulation coil 203 and the lower circulation coil 204 are respectively provided with an independent heat exchange device (not shown in the drawing) to realize the circulation of the heat transfer medium in the coils. The heat exchange devices are capable of cooling, heating, and maintaining temperature.

With the upper circulation coil 203 and the lower circulation coil 204, isothermal planes are formed at the upper end and the lower end inside the reactor body 200. However, with the isothermal planes formed at the upper end and the lower end inside the reactor body only, since heat insulation at the periphery of the reactor is not realized, under the influence of thermal convection, the temperature will be high throughout most of the space from bottom to top, making it impossible to form a balanced temperature gradient, and therefore failing to simulate the temperature gradient throughout the formation. Accordingly, in the present embodiment, N temperature control pipes 205 are spacedly provided inside the reactor body 200 and between the upper circulation coil 203 and the lower circulation coil 204, configured to form a vertical temperature gradient in the reactor body 200, wherein N is a positive integer and determined depending on actual requirement. In the present invention, N is 3, i.e., three temperature control pipes 205 are provided, and each temperature control pipe 205 is also provided with an independent heat exchange device to realize the circulation of the heat transfer medium in the temperature control pipe.

The configuration of providing the upper circulation coil and the lower circulation coil at the upper and lower ends inside the reactor body realizes stable heating. N temperature control pipes are spacedly provided between the upper circulation coil and the lower circulation coil and encircling the reactor body; moreover, each temperature control pipe is also provided with an independent heat exchange device to realize the circulation of the heat transfer medium in the temperature control pipe (i.e., they are also capable of cooling, heating, and maintaining temperature), such that the temperature of each temperature control pipe can be regulated independently, realizing the simulation of formation temperature gradient inside the reactor body.

In addition, since the formation temperature gradually decreases at a certain gradient from bottom to top, in order to realize a more precise simulation of formation temperature gradient, the N temperature control pipes are equally spaced from bottom to top and a constant temperature difference is given between the temperature control pipes; such configuration the arrangement of low temperature zone to high temperature zone at intervals of the same temperature difference and distance from top to bottom. Specifically, the lower circulation coil 204 is set to produce a high temperature T1, while the upper circulation coil 203 is set to produce a low temperature T2; N temperature control pipes 205 are provided, wherein the temperature difference between the temperature control pipes 205 can be expressed as $\Delta T=(T1-T2)/(N+1)$, i.e., the temperature control pipes 205 from top to bottom are respectively set to produce a temperature of $T2+\Delta T$, $T2+2\Delta T$, ..., and $T2+N\Delta T$.

Moreover, in order to maintain the temperature difference $\Delta T$ between the temperature control pipes stable in real time so as to achieve the most realistic simulation of the formation, temperature sensors are provided inside the reactor body 200, configured to monitor the temperatures of the upper circulation coil 203, the lower circulation coil 204 and the N temperature control pipes 205 and transmit the monitored temperature data to a temperature regulator. The temperature regulator regulates in real time the operation of each heat exchange device according to the monitored temperature data, so as to maintain the vertical temperature gradient in the reactor body stable. Specifically in the present embodiment, the temperature difference for the vertical temperature gradient is set to be 5° C., and the temperature control accuracy is ±0.5° C.

In some embodiments, in order to simulate the layered structure of hydrate-bearing stratum, a flow field measurement device is also provided. The flow field measurement device can quantify the flow field inside the reactor, enabling the study on the relationship between the flow field and the exploitation products during the simulated exploitation in full-sized wells.

During the operation inside the reactor, a plurality of vertical wells are disposed throughout each layer, including one central vertical well (i.e., the full-diameter well) located at center and non-central vertical wells being the remainders; the flow field measurement device comprises non-central vertical well pressure sensors, non-central vertical well outlet valves, communicating vessel valves, differential pressure sensors, a communicating vessel, a central vertical well outlet valve, and a central vertical well pressure sensor; the non-central vertical well pressure sensors, the non-central vertical well outlet valves, the differential pressure sensors, and the communicating vessel valves are respectively provided in an amount identical to that of the non-central vertical wells; each of the non-central vertical well is provided with a non-central vertical well outlet pipeline, wherein each non-central vertical well outlet pipeline is correspondingly provided with one of the non-central vertical well pressure sensors, one of the non-central vertical well outlet valves, one of the differential pressure sensors, and one of the communicating vessel valves communicatedly in sequence, and all of the communicating vessel valves are connected with the communicating vessel; the central vertical well is provided with a central vertical well outlet pipeline, wherein the central vertical well outlet pipeline is provided with the central vertical well pressure sensor and the central vertical well outlet valve communicatedly in sequence, and the central vertical well outlet valve is connected with the communicating vessel.

Figure 4:
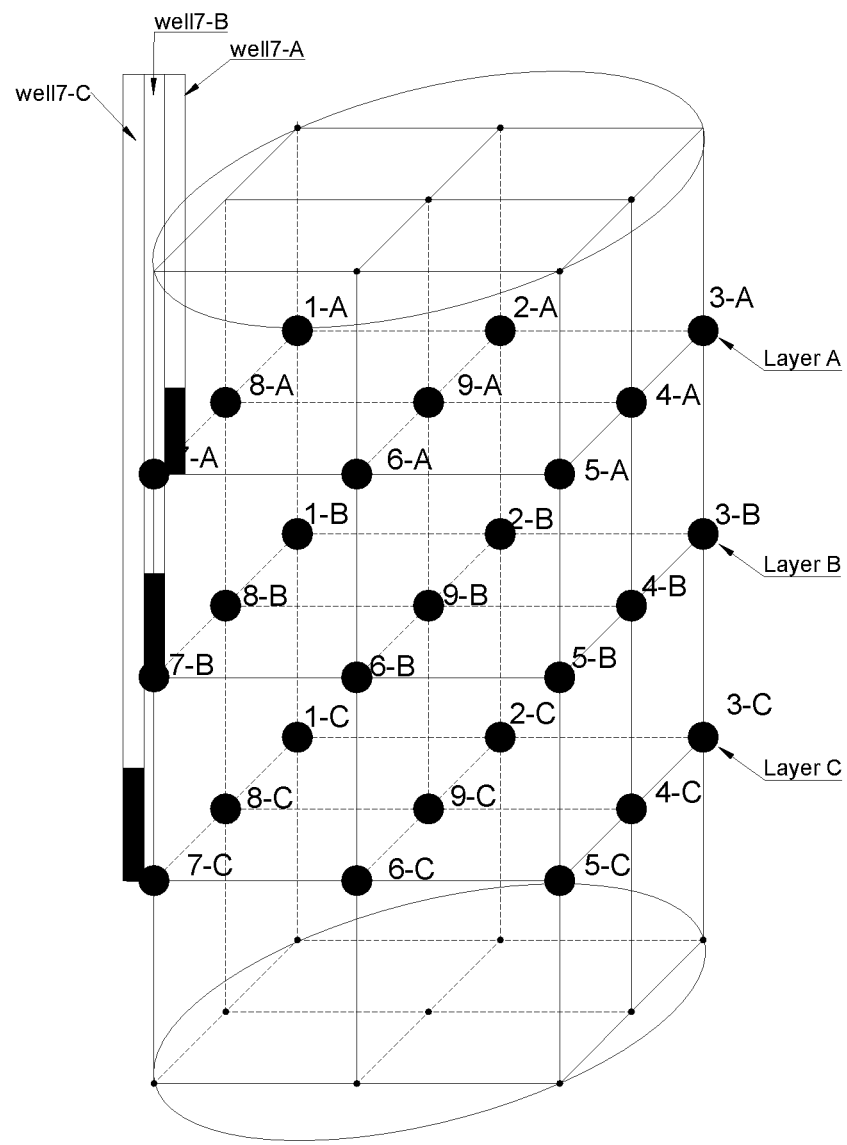
FIG. 4 shows the distribution of measuring points of the flow field measurement device provided in the reactor.
Figure 5:
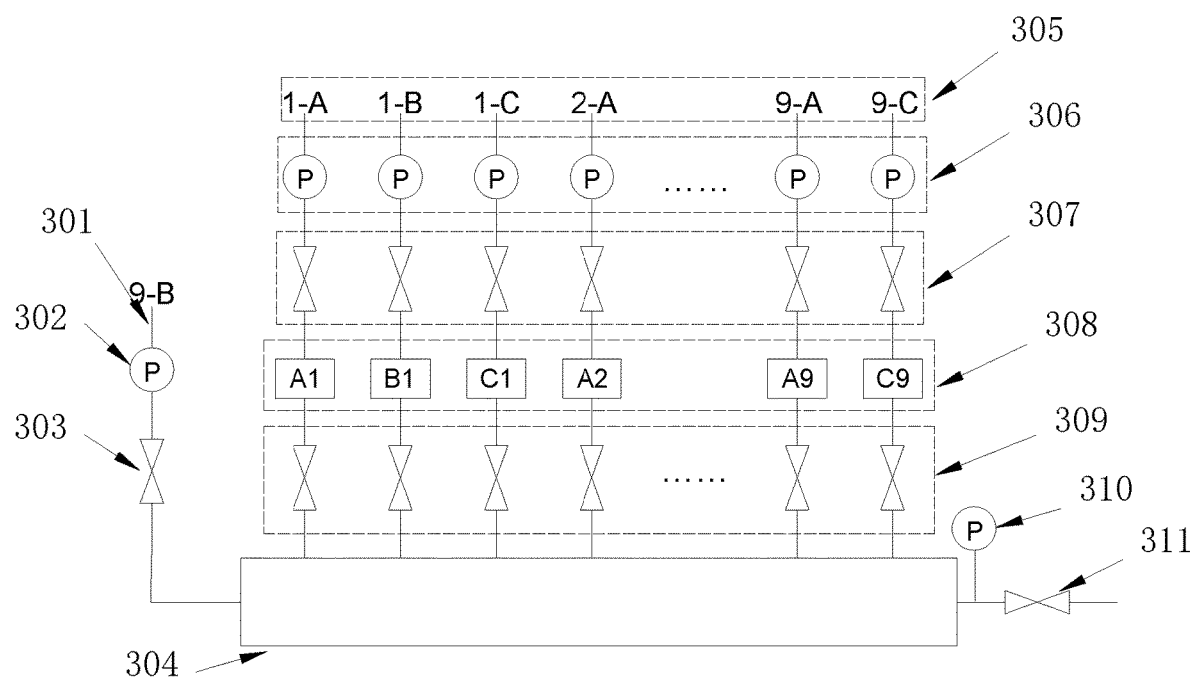
FIG. 5 shows the flow field measurement device.

Reference is made to FIG. 4 that there are twenty-seven vertical wells disposed inside the reactor of the natural gas hydrate experimental system of the present embodiments, and the natural gas hydrate reservoir is divided into three layers, wherein nine vertical wells are symmetrically distributed throughout each layer. The wells are respectively numbered as 1-A, 2-A, . . . , 9-B, and 9-C, wherein the vertical well 9-B located at center is a central vertical well, while the remaining vertical wells are non-central vertical wells. As shown in FIG. 5, the flow field measurement device provided in the present embodiment mainly comprises non-central vertical well pressure sensors 306, non-central vertical well outlet valves 307, communicating vessel valves 309, differential pressure sensors 308, a communicating vessel 304, a central vertical well outlet valve 303, and a central vertical well pressure sensor 302.

The non-central vertical well pressure sensors 306, the non-central vertical well outlet valves 307, the differential pressure sensors 308, and the communicating vessel valves 309 are respectively provided in an amount identical to that of the non-central vertical wells. All non-central vertical well outlet pipelines 305, except for the vertical well 9-B, are respectively connected to a non-central vertical well pressure sensor 306, a non-central vertical well outlet valve 307, and one end of a differential pressure sensor 308 in sequence. The other end of the differential pressure sensor 308 is connected to a communicating vessel valve 309. All of the communicating vessel valves 309 are connected with the communicating vessel 304. The other end of the communicating vessel 304 is connected to the central vertical well outlet valve 303, the central vertical well pressure sensor 302, and a central vertical well outlet pipeline 301.

The twenty-six differential pressure sensors are respectively numbered as A1, B1, C1, A2, . . . , A9, and C9, representing the differential pressure sensor connecting the well 1-A and well 9-B, the differential pressure sensor connecting the well 1-B and well 9-B, . . . , the differential pressure sensor connecting the well 9-A and well 9-B, and the differential pressure sensor connecting the well 9-C and well 9-B. Specifically, the differential pressure sensors 8 have a measuring accuracy higher than that of the central vertical well pressure sensor 302 and non-central vertical well pressure sensors 306, and a measuring range lower than that of the central vertical well pressure sensor 302 and non-central vertical well pressure sensors 306. Since the pressure sensors are not applicable for low pressure differences due to their low measuring accuracy while the differential pressure sensors 308 have a higher measuring accuracy, when the pressure difference is relatively low, the pressure sensors may show the same readings while the differential pressure sensors is capable of revealing the pressure difference; when the pressure difference is relatively high and exceed the measuring range of the differential pressure sensors, the differential pressure sensors may be damaged. In summary, the differential pressure sensors have a high accuracy but a low measuring range, while the pressure sensors have a high measuring range but a low accuracy, and thus these two kinds of sensors should be used in combination.

Accordingly, when it is necessary to inspect a flow field in the reactor, the first step is recording readings of the twenty-seven pressure sensors to obtain a pressure difference between each vertical well and the central vertical well, and then comparing the obtained pressure difference with a measuring range of the differential pressure sensor; if the obtained pressure difference is higher than the measuring range of the differential pressure sensor, then the obtained pressure difference is determined to be a pressure difference between the non-central vertical well corresponding to the differential pressure sensor and the central vertical well; if the obtained pressure difference is not higher than the measuring range of the differential pressure sensor, then opening the non-central vertical well outlet valve and the communicating vessel valve which are connected to the differential pressure sensor, and measuring the pressure difference between the corresponding non-central vertical well and the central vertical well using the differential pressure sensor. Driven by the pressure differences, gas and liquid will flow spontaneously from a high pressure zone to a low pressure zone (or tend to flow spontaneously from the high pressure zone to the low pressure zone), in other words, the accurate measurement of flow field in the reactor is realized.

In view of the above, with the flow field measurement device, the flow field inside the reactor is quantified according to the pressure differences between the points, accurately and effectively. Providing differential pressure sensors, between a measuring point of the central vertical well and a measuring point of each of the non-central vertical wells, to measure the pressure differences, enables reasonable distribution of three-dimensional space inside the entire reactor, making it easier to analyze the gas-liquid flow trends in the reactor with the simulated flow field. The step of determining whether to turn on the differential pressure sensors according to a predetermination based on the feedback from the pressure sensors, allows flow field measurements in the reactor under both high and low pressure differences and effective protection of the differential pressure sensors. Meanwhile, since communication of the entire measurement device is realized by the vertical well outlet pipelines, the measurement device can be externally connected to the reactor, in other words, the differential pressure sensors and the communicating vessel can be disposed outside the reactor. Thus, it is not necessary to conduct significant modifications to the entire gas hydrate system, and no damage will be done to the experimental devices; for a natural gas hydrate experimental system without flow field measurement function, it is possible to introduce the present device whenever it is required to carry out the study on the relationship between the flow field and the exploitation products.

A method for simulating exploitation of natural gas hydrates in full-sized production wells, using any one of the above mentioned device and the reactor, comprises:

sealing a certain amount of the perforations or providing each of the certain amount of the perforations with the sand control unit;

sealingly disposing the full-diameter well inside the reactor throughout a horizontal direction of a vertical direction and initiating the hydrate formation process, wherein the upper end of the full-diameter well protrudes from the upper cover of the reactor, the perforations are positioned inside the reactor body, and the lower end of the full-diameter well protrudes from the lower cover of the reactor;

after natural gas hydrates formed in the reactor are sufficient for carrying out the simulated exploitation, allowing the gas-water-sand mixture to enter the full-diameter well through the perforations, discharging the gas-water-sand mixture through the exploitation passage, discharging the water through the water discharging passage, and discharging the methane gas through the gas discharging passage.

The present embodiment comprises:

(1) Sand control screen installation: The perforations can be respectively provided with sand control screens of different mesh sizes, allowing the evaluation of sand control effects of different mesh sizes. The central well is then placed into the reactor.

(2) Into the reactor horizontally or vertically: After the upper and lower covers of the reactor, each having a hole in the center, are fixed at a specific direction, the central well is inserted through the covers, with O-rings as the sealing means between the well and the covers. After the installation and sealing of pipelines are complete, stratum sands are loaded into the reactor.

(3) Water discharging: The water discharging pipes of different levels disposed in the central wall allow discharging different amounts of water from the central well during the simulated exploitation.

(4) Sand production and sand control during exploitation: This step comprises sealing a certain amount of the perforations or providing each of the certain amount of the perforations with the sand control unit, wherein simulation of sand control design or blockage at different regions can be realized by installing sand-control units or sealing the corresponding perforations. Heating pipelines, gas production pipelines, and wellhead pipelines are provided above the well; after the installation and sealing of pipelines are complete, stratum sands are loaded into the reactor. Then, gas and fluid will be introduced into the reactor, accompanying the step of lowering the temperature and increasing the pressure to initiate the formation of hydrates. When natural gas hydrates formed in the reactor are sufficient for carrying out the simulated exploitation, different exploitation methods may be carried out to make the hydrates dissociate to produce gas, water, and sand, which flow through the screens and enter the well, and thereby it is possible to determine the sand control effect by measurement.

(5) Well replacement: The central vertical well can be replaced by a smaller well wherein a bushing is provided at the reactor cover for sealing.

Depending on the needs, the exploitation method can be selected from the depressurization method and the thermal stimulation method, wherein the depressurization method is one of the currently major methods for hydrate exploitation, which involves a dissociation process of hydrate solids to produce methane gas, caused by reducing the pressure on the gas hydrate layer to lower than the phase equilibrium pressure of hydrate under the local temperature. Design of exploitation wells for the depressurization method is similar to those for conventional exploitation of oil and gas; the pressure spreads quickly in the hydrate reservoir with higher permeability, and thus the depressurization method is the most potential method which is economical and effective. The thermal stimulation method refers to a process of heating the gas hydrate layer to raise its temperature to above the equilibrium temperature, which causes the gas hydrate to dissociate into water and natural gas.

The above-mentioned embodiments are only intended to illustrate the technical concept and characteristics of the present invention, enabling those of ordinary skill in the art to understand the content of the present invention and implement them accordingly, but are not intended to limit the scope of the present invention. All equivalent changes or modifications made according to the essence of the present invention should fall within the scope of the present invention.

What is claimed is:

1. A device comprising a well; wherein the device is configured to be disposed in a reactor; the reactor comprises an upper cover, a lower cover, and a reactor body, and the upper cover and the lower cover are sealably attached to two ends of the reactor to form a closed chamber; the closed chamber is filled with porous medium and liquid; the well comprises an upper sealing unit and a lower sealing unit, and a heating circulation tube and a temperature sensor tube are disposed inside the well;

the upper sealing unit comprises an upper plug and an upper plug locking cap; the upper plug is sealingly inserted into an upper end of the well, and the upper plug is fixed by the upper plug locking cap; a gas discharging passage is provided penetrating the upper plug, wherein the gas discharging passage is configured to discharge methane gas;

the lower sealing unit comprises a lower plug and a lower plug locking cap; the lower plug is sealingly inserted into a lower end of the well, and the lower plug is fixed by the lower plug locking cap; an exploitation passage and a water discharging passage are provided penetrating the lower plug, wherein the exploitation passage is configured to discharge a gas-water-sand mixture, and the water discharging passage is configured to discharge water from the well to obtain a well fluid;

a first end of the heating circulation tube penetrates the upper plug, and the first end of the heating circulation tube is fixed at the upper plug; a second end of the heating circulation tube extends towards the lower end of the well until the second end of the heating circulation tube bends above the lower end of the well and then the second end of the heating circulation tube extends towards the upper end of the well; the heating circulation tube is configured to prevent hydrate formation inside the well;

a first end of the temperature sensor tube penetrates the upper plug, and the first end of the temperature sensor tube is fixed at the upper plug; a second end of the temperature sensor tube extends towards the lower end of the well; temperature sensors are provided inside the temperature sensor tube, wherein the temperature sensors are configured to obtain temperature data from an inside of the well;

perforations are provided along a body of the well; the perforations are configured to be closed during a hydrate formation process and be open to allow the gas-water-sand mixture to enter the well through the perforations, wherein each of the perforations is provided with a sand control unit.

2. The device according to claim 1, wherein the sand control unit comprises a perforation fixing ring, a screen gasket, and a sand control screen, the screen gasket is disposed between the sand control screen and the perforation, and the sand control screen is fixed to the perforation by the perforation fixing ring.

3. The device according to claim 1, wherein, the water discharging passage comprises four water discharging pipes; first ends of the four water discharging pipes penetrate the lower plug and are fixed at the lower plug, second ends of the four water discharging pipes extend towards the upper plug to four different extents to form a stepped structure such that the four water discharging pipes are respectively configured to discharge ¼, ½, ¾, and all of the water from the well.

4. The device according to claim 1, wherein the upper plug has a flange, and an inner step is formed at the upper end of well for mating the flange; when the upper plug is sealingly inserted into the upper end of the well, the flange of the upper plug is secured at the inner step, and the upper plug locking cap covers the flange to realize sealing; a first O-ring is sealingly provided between the first end of the temperature sensor tube and the upper plug; a section of the heating circulation tube sticks out from the upper plug, and the section of the heating circulation tube is fixed by a locknut.

5. The device according to claim 1, wherein, a filter element is provided at a gas inlet of the gas discharging passage, a filter element gasket is provided between the filter element and the upper plug, and the filter element is fixed at the gas inlet by a filter element fixing cap; the first end of the heating circulation tube is fixed at the upper plug by a double ferrule fitting and a hollow bolt; a second O-ring is sealingly provided between the lower plug and the well; the well and the upper plug locking cap are made of polyether ether ketone (PEEK) or nylon, and the well and the upper plug locking cap are surface roughened.

6. The device according to claim 1, wherein, a temperature gradient device is provided inside the reactor, and the temperature gradient device comprises an upper circulation coil and a lower circulation coil; the upper circulation coil and the lower circulation coil are respectively disposed at an upper end and a lower end inside the reactor body; the upper circulation coil and the lower circulation coil are respectively provided with a self-contained heat exchange device to realize a circulation of a heat transfer medium in the coil; N temperature control pipes are spacedly provided inside the reactor body and between the upper circulation coil and the lower circulation coil, and the N temperature control pipes are configured to form a vertical temperature gradient in the reactor body, wherein N is a positive integer; each of the N temperature control pipes is provided with a self-contained heat exchange device to realize the circulation of the heat transfer medium in the temperature control pipe.

7. The device according to claim 6, wherein the N temperature control pipes are equally spaced from bottom to top and a constant temperature difference is set between the N temperature control pipes, and the temperature difference is expressed as:

$\Delta T=(T_1-T_2)/(N+1)$, wherein $T_1$ represents a temperature of the lower circulation coil, and $T_2$ represents a temperature of the upper circulation coil, and $T_1>T_2$.

8. The device according to claim 6, wherein, temperature sensors are provided inside the reactor body, and the temperature sensors are configured to monitor temperatures of the upper circulation coil, the lower circulation coil and the N temperature control pipes and transmit monitored temperature data to a regulator; the regulator is configured to regulate in real time an operation of each heat exchange device according to the monitored temperature data to maintain the vertical temperature gradient in the reactor body.

9. The device according to claim 1, wherein, a mesh is provided at the exploitation passage, the mesh is fixed at an inlet groove of the exploitation passage by a mesh fixing cap, and a mesh gasket is provided between the mesh and the inlet groove.

10. A method for, using the device of claim 1 and the reactor, wherein the reactor comprises the upper cover, the reactor body, and the lower cover, and the method comprises:

sealing a predetermined number of the perforations or providing each of the predetermined number of the perforations with the sand control unit;

sealingly disposing the well inside the reactor throughout a horizontal direction or a vertical direction and initiating the hydrate formation process, wherein the upper end of the well protrudes from the upper cover of the reactor, the perforations are positioned inside the reactor body, and the lower end of the well protrudes from the lower cover of the reactor; and after the natural gas hydrates are formed in the reactor, allowing the gas-water-sand mixture to enter the well through the perforations, discharging the gas-water-sand mixture through the exploitation passage, discharging the water through the water discharging passage, and discharging the methane gas through the gas discharging passage.

11. The method according to claim 10, wherein the sand control unit comprises a perforation fixing ring, a screen gasket, and a sand control screen, the screen gasket is disposed between the sand control screen and the perforation, and the sand control screen is fixed to the perforation by the perforation fixing ring.

12. The method according to claim 10, wherein, the water discharging passage comprises four water discharging pipes; first ends of the four water discharging pipes penetrate the lower plug and are fixed at the lower plug, second ends of the four water discharging pipes extend towards the upper plug to four different extents to form a stepped structure such that the four water discharging pipes are respectively configured to discharge ¼, ½, ¾, and all of the water from the well.

13. The method according to claim 10, wherein, the upper plug has a flange, and an inner step is formed at the upper end of the well for mating the flange; when the upper plug is sealingly inserted into the upper end of the well, the flange of the upper plug is secured at the inner step, and the upper plug locking cap covers the flange to realize sealing; a first O-ring is sealingly provided between the first end of the temperature sensor tube and the upper plug; a section of the heating circulation tube sticks out from the upper plug, and the section of the heating circulation tube is fixed by a locknut.

14. The method according to claim 10, wherein, a filter element is provided at a gas inlet of the gas discharging passage, a filter element gasket is provided between the filter element and the upper plug, and the filter element is fixed at the gas inlet by a filter element fixing cap; the first end of the heating circulation tube is fixed at the upper plug by a double ferrule fitting and a hollow bolt; a second O-ring is sealingly provided between the lower plug and the well; the well and the upper plug locking cap are made of polyether ether ketone (PEEK) or nylon, and the well and the upper plug locking cap are surface roughened.

15. The method according to claim 10, wherein, a temperature gradient device is provided inside the reactor, and the temperature gradient simulator device comprises an upper circulation coil and a lower circulation coil; the upper circulation coil and the lower circulation coil are respectively disposed at an upper end and a lower end inside the reactor body; the upper circulation coil and the lower circulation coil are respectively provided with a self-contained heat exchange device to realize a circulation of a heat transfer medium in the coil; N temperature control pipes are spacedly provided inside the reactor body and between the upper circulation coil and the lower circulation coil, and the N temperature control pipes are configured to form a vertical temperature gradient in the reactor body, wherein N is a positive integer; each of the N temperature control pipes is provided with a self-contained heat exchange device to realize the circulation of the heat transfer medium in the temperature control pipe.

16. The method according to claim 15, wherein the N temperature control pipes are equally spaced from bottom to top and a constant temperature difference is set between the N temperature control pipes, and the temperature difference is expressed as:

$\Delta T=(T_1-T_2)/(N+1)$, wherein T1 represents a temperature of the lower circulation coil, and $T_2$ represents a temperature of the upper circulation coil, and $T_1>T_2$.

17. The method according to claim 15, wherein, temperature sensors are provided inside the reactor body, and the temperature sensors are configured to monitor temperatures of the upper circulation coil, the lower circulation coil and the N temperature control pipes and transmit monitored temperature data to a regulator; the regulator is configured to regulate in real time an operation of each heat exchange method according to the monitored temperature data to maintain the vertical temperature gradient in the reactor body.

18. The method according to claim 10, wherein, a mesh is provided at the exploitation passage, the mesh is fixed at an inlet groove of the exploitation passage by a mesh fixing cap, and a mesh gasket is provided between the mesh and the inlet groove.

* * * * *